June 23, 1925.

J. A. PERKINS

STEERING GEAR CONNECTING ROD

Filed April 30, 1924

1,543,186

Inventor
J. A. Perkins
By Gross & Collings
Attorneys

Patented June 23, 1925.

1,543,186

UNITED STATES PATENT OFFICE.

JAMES AUSTIN PERKINS, OF OPELOUSAS, LOUISIANA.

STEERING-GEAR CONNECTING ROD.

Application filed April 30, 1924. Serial No. 710,036.

*To all whom it may concern:*

Be it known that I, JAMES AUSTIN PERKINS, a citizen of the United States, residing at Opelousas, in the parish of St. Landry and State of Louisiana, have invented certain new and useful Improvements in Steering-Gear Connecting Rods, of which the following is a specification.

This invention relates to safety joint connections and finds particular utility in connection with the steering gear connecting rod in use in certain types of automobiles.

In Ford automobiles, particularly, there is provided a steering gear connecting rod which extends from the spindle connecting rod to the steering gear ball arm, carried on the lower end of the steering column. The union between this connecting rod on the one hand and the spindle connecting rod and steering gear ball arm on the other, includes ball members with which the connecting rod engages.

It has been found that in the course of wear, the joint becomes so loose as to permit a disengagement of the parts, which frequently proves disastrous. It has also been found that, owing to the wear occasioned to these parts, considerable noise and rattling results.

It is therefore the object of this invention to provide means for positively preventing the disengagement of these joints and to provide further means whereby the parts may be prevented from rattling or becoming otherwise noisy.

The novel details, construction and arrangement of parts of this invention will be made more apparent as this description proceeds, especially when considered in connection with the accompanying drawings wherein.

Figure 1:
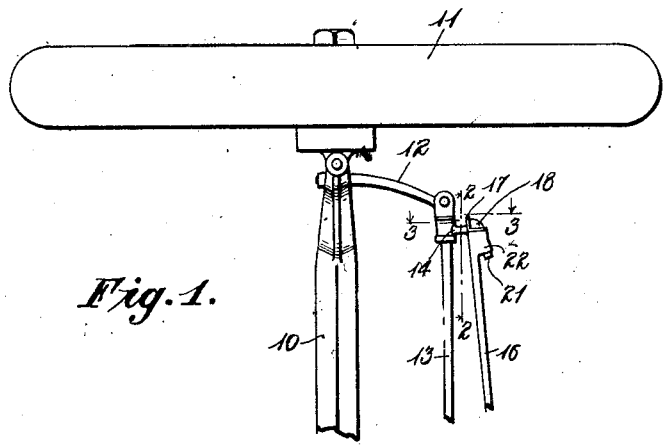
Figure 1 is a fragmentary elevational view, showing a portion of the spindle connecting rod and the steering gear connecting rod, with this invention in use.
Figure 2:
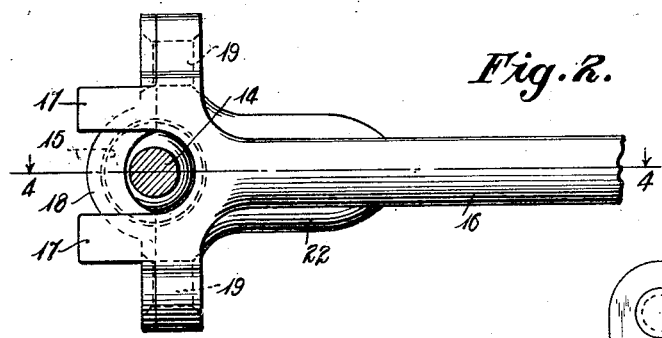
Fig. 2 is an enlarged sectional view, taken substantially on the plane indicated by the line 2—2 in Fig. 1.
Figure 3:
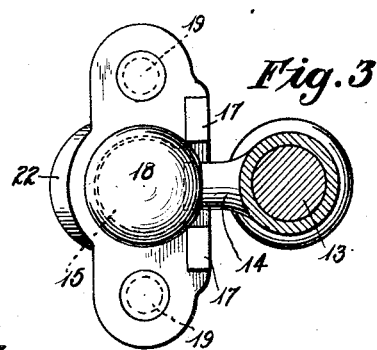
Fig. 3 is a sectional view taken substantially on the plane indicated by the line 3—3 in Fig. 2; and, Fig. 4 is an enlarged horizontal sectional view through the joint.
Figure 4:
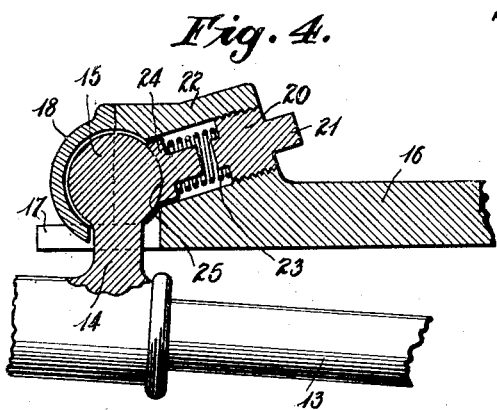

Referring now to the drawing, and particularly to Fig. 1 thereof, it will be noted that the reference character 10 indicates a main axle to which the stub axle carrying the wheel 11 is connected. The steering spindle 12 of the two front wheels are connected by a spindle connecting rod 13. Formed on the rod 13 is a small stub shaft 14, the end 15 of which is ball-shaped. The lower end of the steering column has also affixed thereto a short shaft, the end of which is ball-shaped, and between these two joints, connection is effected by means of a steering gear connecting rod 16. Inasmuch as the connection at each end of the rod 16 is the same, only one end of the same has been illustrated herein in the drawing.

My invention contemplates the forking of the end of a rod 16, to produce a pair of spaced fingers 17, which are adapted to straddle the stub shaft 14, the space between these fingers being less than the diameter of the ball 15 of the joint. In this manner a disconnection of the parts in a lateral direction is prevented, owing to the fact that even after constant wear, the diameter of the ball 15 would not be sufficiently reduced to permit it to pass between the spaced fingers 17. For completing the joint, the customary ball socket cap 18 is bolted as at 19, onto the end of the rod 16.

Each end of the rod 16 will preferably be enlarged somewhat, affording sufficient material in which to form a threaded aperture adapted to receive a threaded plug 20, having a squared portion 21 for the reception of a wrench, whereupon the plug may be screwed into the enlargement 22 which will be formed on the end of the rod 16. By properly adjusting the plug 20, the tension on the coiled spring 23 may be regulated, which spring, in turn, bears against a friction plug or button 24, which engages with its concaved face 25 against the suface of the ball 15. By means of this structure the wear of the parts may be properly compensated for and the joint maintained in a proper working condition, thus eliminating all noise resulting from the rattling of this connection.

From the foregoing, it will be immediately apparent that the joint is not only prevented from becoming accidentally disconnected, owing to wear, but the joint may at all times be kept free from rattle. It is only necessary, in incorporating my invention, to alter the construction of the connecting rod 16, whereupon the aforementioned advantages may be accomplished. In this connection it should be noted that the invention is not limited in its use entirely to the joint between the steering gear connecting rod and its associated parts, but may be employed with equal facility in other parts of the vehicle structure where similar ball joints are employed.

Therefore, while a specific embodiment of the invention has been described and illustrated herein, it should be understood that various modifications of this structure may be resorted to without departing from the scope of the invention, and therefore reservation is made to make such changes in the above disclosure, as may come within the purview of the accompanying claims.

Having thus described my invention, what I claim is:

1. In a jointed connection of the character described, a member provided with a ball and a second member provided with a socket for receiving said ball, spaced fingers formed on said socket member and embracing the member carrying said ball, for the purpose described.

2. In a ball jointed connection of the character described, a member carrying a ball of said ball joint and a second member provided with a socket for receiving said ball and a pair of spaced fingers formed on the end of said second member and embracing said first member immediately adjacent said ball, the space between said fingers being less than the diameter of said ball.

3. A steering gear connecting rod adapted for use in combination with the companion ball parts of a steering gear comprising a rod provided with socket portions at each end adapted to receive said companion ball parts of the joints, a pair of spaced fingers formed on each end of said connecting rod and adapted to embrace said ball carrying members adjacent the balls, the space between said fingers being less than the diameter of said balls and spring influenced adjustable pressure members carried by said rod engaging the balls of said joints for compensating for wear occasioned thereto.

In testimony whereof I affix my signature.

J. AUSTIN PERKINS.